US010639579B2

(12) United States Patent
Nelson et al.

(10) Patent No.: US 10,639,579 B2
(45) Date of Patent: May 5, 2020

(54) PLEATED TANK VENT

(71) Applicant: DONALDSON COMPANY, INC., Minneapolis, MN (US)

(72) Inventors: Robert O. Nelson, Rosemount, MN (US); Daniel Dotzler, Webster, MN (US); Thomas P. J. De Leeuw, Kessel-Lo (BE)

(73) Assignee: Donaldson Company, Inc., Minneapolis, MN (US)

( * ) Notice: Subject to any disclaimer, the term of this patent is extended or adjusted under 35 U.S.C. 154(b) by 130 days.

(21) Appl. No.: 15/516,279

(22) PCT Filed: Oct. 1, 2015

(86) PCT No.: PCT/US2015/053555
§ 371 (c)(1),
(2) Date: Mar. 31, 2017

(87) PCT Pub. No.: WO2016/054409
PCT Pub. Date: Apr. 7, 2016

(65) Prior Publication Data
US 2017/0304763 A1    Oct. 26, 2017

Related U.S. Application Data

(60) Provisional application No. 62/058,449, filed on Oct. 1, 2014.

(51) Int. Cl.
| | |
|---|---|
| *B01D 53/22* | (2006.01) |
| *B01D 46/54* | (2006.01) |
| *B01D 46/52* | (2006.01) |
| *B01D 46/00* | (2006.01) |
| *F01N 3/28* | (2006.01) |

(52) U.S. Cl.
CPC ......... *B01D 46/543* (2013.01); *B01D 46/001* (2013.01); *B01D 46/0005* (2013.01);
(Continued)

(58) Field of Classification Search
CPC .............. B01D 46/521; B01D 2279/35; B01D 46/0005; B01D 2265/029; B01D 2265/04;
(Continued)

(56) References Cited

U.S. PATENT DOCUMENTS

| | | | |
|---|---|---|---|
| 1,522,068 A | 1/1925 | Morgan | |
| 2,795,290 A | 6/1957 | Butsch et al. | |

(Continued)

FOREIGN PATENT DOCUMENTS

| | | |
|---|---|---|
| CA | 2437947 | 6/2008 |
| CA | 2647948 | 11/2011 |

(Continued)

OTHER PUBLICATIONS

"International Preliminary Report on Patentability," for PCT Application No. PCT/US2015/053555 dated Apr. 13, 2017 (12 pages).

(Continued)

*Primary Examiner* — Anthony R Shumate
(74) *Attorney, Agent, or Firm* — Sydney R. Kokjohn

(57) ABSTRACT

The technology disclosed herein relates to a tank vent having a housing and a pleated, vapor-permeable microporous membrane. The housing defines a first vapor passageway configured for direct communication with a tank interior and a second vapor passageway configured for direct communication with the atmosphere. The housing also defines a tank mounting surface is mountable to a tank housing and a media mounting surface. The microporous membrane is sealed to the media mounting surface and defines a tubular structure such that the first vapor passageway and the second vapor passageway are in communication through the microporous membrane. Other embodiments including methods are also disclosed.

10 Claims, 11 Drawing Sheets

(52) U.S. Cl.
CPC ......... *B01D 46/521* (2013.01); *F01N 3/2896* (2013.01); *B01D 2265/02* (2013.01); *B01D 2265/029* (2013.01); *B01D 2265/04* (2013.01); *B01D 2279/35* (2013.01); *F01N 2610/02* (2013.01); *F01N 2610/1426* (2013.01)

(58) Field of Classification Search
CPC ................ B01D 46/001; B01D 46/543; B01D 2265/02; Y02T 10/24; Y02A 50/2325; B60K 15/035; B60K 2015/0346; B60K 2015/03528; B60K 13/04; F01N 2610/02; F01N 3/2066; F01N 3/2896; F01N 2610/1426; F01N 2610/142
See application file for complete search history.

(56) References Cited

U.S. PATENT DOCUMENTS

| | | | |
|---|---|---|---|
| 3,167,416 A | | 1/1965 | Humbert, Jr. et al. |
| 3,221,575 A | | 12/1965 | Frank |
| 3,251,475 A | | 5/1966 | Till et al. |
| 3,314,306 A | | 4/1967 | Barclae |
| 3,505,794 A | * | 4/1970 | Nutter .................... B01D 39/18 55/487 |
| 3,546,853 A | | 12/1970 | Claar |
| 3,686,973 A | | 8/1972 | Davison et al. |
| 3,812,928 A | | 5/1974 | Rockwell et al. |
| 3,916,724 A | | 11/1975 | Muller et al. |
| 4,130,487 A | * | 12/1978 | Hunter .................... B01D 27/06 210/259 |
| 4,136,796 A | | 1/1979 | Dubois et al. |
| 4,314,831 A | * | 2/1982 | Barbic ................. B01D 46/001 310/56 |
| 4,331,185 A | | 5/1982 | Rinaldo et al. |
| 4,351,203 A | | 9/1982 | Fukunaga |
| 4,440,308 A | | 4/1984 | Baker |
| 4,506,562 A | | 3/1985 | Yamaura et al. |
| 4,554,844 A | | 11/1985 | Hamano |
| 4,557,526 A | | 12/1985 | Smith |
| 4,753,730 A | | 6/1988 | Maurer |
| 4,911,035 A | | 3/1990 | Taguchi |
| 4,970,913 A | | 11/1990 | Kielar et al. |
| 5,024,345 A | | 6/1991 | Deweerdt |
| 5,062,447 A | | 11/1991 | Davison, Jr. et al. |
| 5,127,287 A | | 7/1992 | Taniguchi et al. |
| 5,129,422 A | | 7/1992 | Davison, Jr. et al. |
| 5,220,854 A | | 6/1993 | Allart et al. |
| 5,245,891 A | | 9/1993 | Marich et al. |
| 5,348,570 A | | 9/1994 | Ruppert, Jr. et al. |
| 5,492,393 A | | 2/1996 | Peisker et al. |
| 5,505,525 A | | 4/1996 | Denton |
| 5,509,949 A | | 4/1996 | Mulvihill et al. |
| 5,515,747 A | | 5/1996 | Okada et al. |
| 5,522,769 A | | 6/1996 | Deguiseppi |
| 5,571,604 A | | 11/1996 | Sprang et al. |
| 5,575,832 A | | 11/1996 | Boyd |
| 5,724,864 A | | 3/1998 | Rodgers et al. |
| 5,785,390 A | | 7/1998 | Gold et al. |
| 5,860,708 A | | 1/1999 | Borders et al. |
| 5,891,223 A | | 4/1999 | Shaw et al. |
| 5,914,415 A | | 6/1999 | Tago |
| 5,928,516 A | | 7/1999 | Hopkins et al. |
| 6,024,417 A | | 2/2000 | Jones, II et al. |
| 6,058,969 A | | 5/2000 | Bollwahn et al. |
| 6,123,175 A | | 9/2000 | Fett |
| 6,145,559 A | | 11/2000 | Ingram, II et al. |
| 6,213,170 B1 | | 4/2001 | Burke et al. |
| 6,422,107 B1 | | 7/2002 | Kidokoro et al. |
| 6,447,565 B1 | | 9/2002 | Raszkowski |
| 6,521,012 B2 | | 2/2003 | Lamon et al. |
| 6,553,865 B1 | | 4/2003 | Endreszl |
| 6,712,887 B2 | | 3/2004 | Ueki et al. |
| 6,725,743 B2 | | 4/2004 | White |
| 6,895,943 B1 | | 5/2005 | Taxon |
| 7,156,890 B1 | | 1/2007 | Thompson et al. |
| 7,159,606 B2 | | 1/2007 | Paluncic et al. |
| 7,162,936 B2 | | 1/2007 | Ronge |
| 7,211,123 B2 | | 5/2007 | Johannesso |
| 7,329,298 B1 | | 2/2008 | Hasinski |
| 7,370,729 B2 | | 5/2008 | Okuno et al. |
| 7,445,220 B2 | | 11/2008 | Von Mayenburg et al. |
| 7,517,392 B2 | | 4/2009 | Neff et al. |
| 7,597,114 B2 | | 10/2009 | Buckingham et al. |
| 7,604,020 B2 | | 10/2009 | Kennedy |
| 7,878,517 B2 | | 2/2011 | Von Mayenburg et al. |
| 8,104,374 B2 | | 1/2012 | Matsubara et al. |
| 8,272,398 B2 | | 9/2012 | Erdmann |
| 8,328,135 B2 | | 12/2012 | Campbell |
| 8,360,091 B2 | | 1/2013 | Revink |
| 8,419,029 B2 | | 4/2013 | Muckelrath et al. |
| 8,459,013 B2 | | 6/2013 | Hosaka et al. |
| 8,529,657 B2 | | 9/2013 | Kincaid et al. |
| 8,590,836 B2 | | 11/2013 | Campbell |
| 8,608,954 B2 | | 12/2013 | Jannot et al. |
| 8,715,127 B2 | | 5/2014 | Beutler et al. |
| 2002/0112802 A1 | | 8/2002 | D'amico et al. |
| 2003/0010002 A1 | * | 1/2003 | Johnson ............. B01D 39/1623 55/486 |
| 2003/0101866 A1 | | 6/2003 | Noack |
| 2005/0098160 A1 | | 5/2005 | Taxon et al. |
| 2006/0242933 A1 | | 11/2006 | Webb et al. |
| 2007/0240537 A1 | | 10/2007 | Basham |
| 2007/0289288 A1 | | 12/2007 | Dawson et al. |
| 2009/0288558 A1 | | 11/2009 | Duello et al. |
| 2010/0024898 A1 | | 2/2010 | Bansal et al. |
| 2011/0221156 A1 | | 9/2011 | Muckelrath et al. |
| 2012/0006839 A1 | | 1/2012 | Shears |
| 2012/0067215 A1 | * | 3/2012 | Lindahl ............. B01D 39/1623 95/90 |
| 2012/0186677 A1 | | 7/2012 | Wetzel et al. |
| 2012/0325369 A1 | | 12/2012 | Moreland |
| 2013/0125691 A1 | | 5/2013 | Wappling et al. |
| 2014/0060699 A1 | | 3/2014 | Szymusiak et al. |
| 2014/0096493 A1 | * | 4/2014 | Kelmartin .......... B01D 46/0002 55/482 |
| 2017/0144128 A1 | * | 5/2017 | Carrion .................... B01J 19/14 |
| 2017/0259216 A1 | * | 9/2017 | Madhavaram .......... B01D 35/30 |

FOREIGN PATENT DOCUMENTS

| | | |
|---|---|---|
| DE | 10134042 | 4/2003 |
| DE | 102004046844 | 10/2005 |
| DE | 102012203541 | 9/2013 |
| EP | 0744153 | 7/2002 |
| EP | 1290361 | 8/2004 |
| EP | 1385707 | 10/2004 |
| EP | 1102002 | 3/2006 |
| EP | 1647320 | 4/2006 |
| EP | 1239189 | 8/2006 |
| EP | 1403557 | 5/2009 |
| EP | 2007500 | 12/2010 |
| EP | 2006503 | 7/2011 |
| EP | 1764532 | 5/2012 |
| GB | 2462176 | 2/2010 |
| JP | 5209671 | 6/2013 |
| WO | 0190604 | 11/2001 |
| WO | 02092363 | 11/2002 |
| WO | 2004104450 | 12/2004 |
| WO | 2005100832 | 10/2005 |
| WO | 2009088795 | 7/2009 |
| WO | 2011025584 | 3/2011 |
| WO | 2013025991 | 2/2013 |
| WO | 2013134274 | 9/2013 |
| WO | 2014114305 | 7/2014 |
| WO | 2016054409 | 4/2016 |

OTHER PUBLICATIONS

"International Search Report & Written Opinion," for PCT/US2015/053555 dated Dec. 17, 2015 (17 pages).

\* cited by examiner

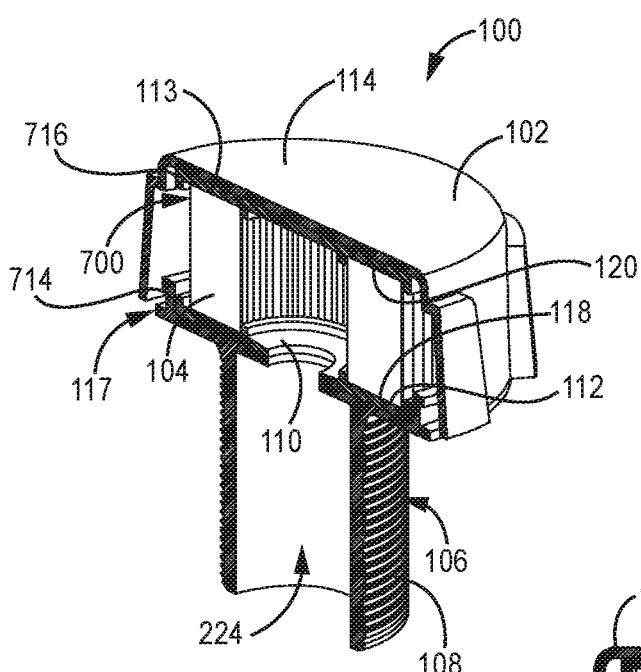
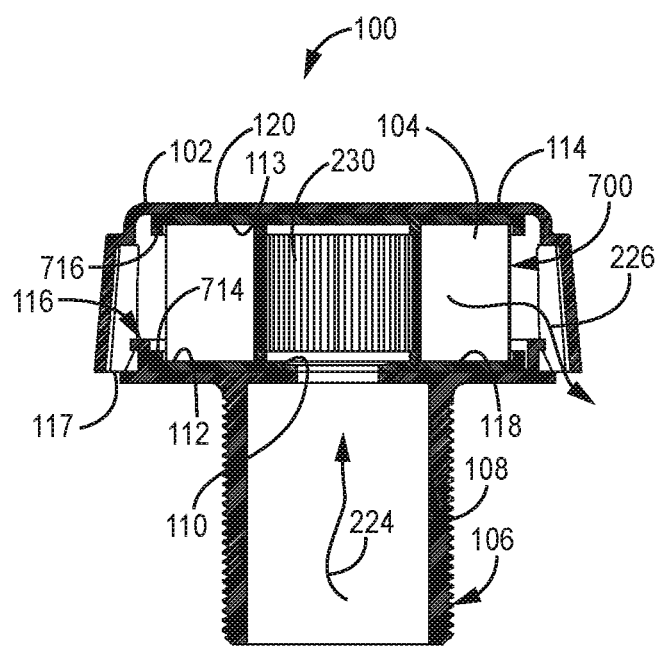

PLEATED TANK VENT

This application is a national stage application under 35 U.S.C. 371 of PCT International Application No. PCT/US2015/053555, filed on Oct. 1, 2015, which claims priority to U.S. Provisional Patent Application No. 62/058,449, filed on Oct. 1, 2014, which applications are incorporated herein by reference. To the extent appropriate, a claim of priority is made to each of the above disclosed applications.

FIELD OF THE TECHNOLOGY

The present application relates to a tank vent. More specifically, the present application relates to a pleated tank vent.

BRIEF DESCRIPTION OF THE FIGURES

The present application may be more completely understood in connection with the following drawings, in which:

FIG. 1 is a perspective view of a cross-section of a tank vent, according to an embodiment.

FIG. 2 is a cross-section view of a tank vent, consistent with the embodiment depicted in FIG. 1.

Figure 3:
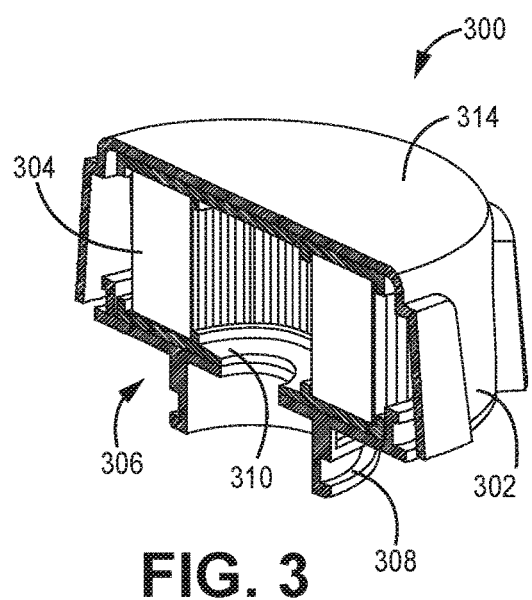
FIG. 3 is a perspective view of a cross-section of an alternative tank vent, according to an embodiment.

While the presently disclosed technology is susceptible to various modifications and alternative forms, specifics thereof have been shown by way of example and drawings, and will be described in detail. It should be understood, however, that the current technology is not limited to the particular embodiments described. On the contrary, the intention is to cover modifications, equivalents, and alternatives falling within the spirit and scope of this application.

DETAILED DESCRIPTION

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

The present disclosure generally relates to tank vents that are configured to vent vapors to and from a tank and prevent the ingress of contaminants such as particles and liquids to the tank. Generally the tank will be configured to hold a liquid. In a variety of embodiments the tank holds a urea solution, such as urea tanks incorporated in diesel vehicle exhaust systems. Vents according to the present technology can certainly be incorporated into other types of tanks, however.

FIG. 1 shows a perspective view of a cross-section of a tank vent 100, according to an embodiment, and FIG. 2 depicts a cross-sectional view consistent with the embodiment depicted in FIG. 1. The tank vent 100 is generally configured to vent vapors from a tank, where the tank can be configured to contain one or more liquids. The tank vent 100 can be configured to be coupled to a tank, such as a urea tank. The tank vent 100 generally has a housing 102 and a filter element 104 disposed within the housing 102.

The housing 102 of the tank vent is generally configured to direct airflow between the interior of a tank (to which it is coupled) and the atmosphere through the filter element 104. The housing 102 depicted in FIG. 1 has a base portion 106 defining a first media mounting surface 112 and a cap portion 114 defining a second media mounting surface 113. The housing 102 defines a first vapor passageway 224 configured for direct communication with the interior of a tank and a second vapor passageway 226 configured for direct communication with the atmosphere such that air passing from the interior of the tank to the atmosphere is directed through the filter element 104 mounted to the media mounting surfaces 112, 113. As such, the first vapor passageway 224 and the second vapor passageway 226 are in communication through the filter element 104. The housing 102 can be constructed of a variety of materials and combinations of materials such as polymers or metals, as will be appreciated by those having skill in the art.

Returning to the embodiment depicted in FIG. 1, the cap portion 114 of the housing 102 is configured to substantially encase the filter element 104. The terms "substantial" and "substantially" as used herein may be applied to modify any quantitative or qualitative representation which could permissibly vary without resulting in a change in the basic function to which it is related. For example, a cap portion as disclosed herein encasing the microporous membrane may also substantially encase the microporous membrane and may permissibly have a shape that only partially encloses the microporous membrane if its ability to provide a second media mounting surface for the filter element subassembly is not materially altered. In some alternative embodiments the cap portion 114 can be relatively shallow and can only partially encase the filter element 104. In one embodiment, the cap portion 114 extends about half-way along the side of the filter element. In one embodiment, the cap portion extends about one-quarter of the way along the filter element. In such embodiments the base portion 106 can also be configured to partially encase the filter element 104 and the base portion can define a bowl structure.

In the embodiments of FIGS. 1-2, the cap portion 114 of the housing 102 is configured to releasably couple to the base portion 106 of the housing 102 via interlocking snap-on structures 116 defined by the cap portion 114 and the base portion 106. As used herein, "releasably couple" means to connect in a way that can be mechanically reversed without damaging the cap portion or the base portion. In at least one embodiment the cap portion 114 couples to the base portion 106, although not in a releasable manner. The cap portion 114 can be configured to couple to the base portion 106 using a variety of means, as will be appreciated, such as via a snap-fit, press-fit, screw-fit, frictional fit, weld, an adhesive, and the like.

In the current embodiment, the second vapor passageway 226 is defined between the cap portion 114 and the base portion 106 of the housing 102, which directs airflow between the atmosphere and the filter element 104. While many different configurations could be employed to define the second vapor passageway 226, in the current embodiment the cap portion 114 and the base portion 106 mutually define a gap 117 at intervals between the interlocking snap-on structures 116.

In the current embodiment, the base portion 106 of the housing 102 defines a tank mounting surface 108 that is mountable to the tank housing. Generally the tank mounting surface 108 is configured to enable direct communication between the tank interior and the first vapor passageway 224 of the tank vent 100. The tank vent 100 can generally be coupled to a tank with a snap-fit, a weld, a press-fit, a screw-fit, a clip, or the like. In the embodiment of FIGS. 1-2, the base portion 106 of the tank vent 100 has a stem that is the tank mounting surface 108. The stem 108 can be configured to be received by an opening defined by the tank to couple the tank vent 100 to the tank, thereby placing the first vapor passageway 224 and the tank interior in direct communication. The stem 108 defines threads that are generally configured to mate with threads defined by the tank to result in a screw-fit. Generally the vent housing 102 will form a seal with the tank, which can be achieved by simply mounting the housing to the tank, or by disposing O-rings, adhesives, and the like, between the vent housing 102 and the tank.

The base portion 106 of the housing 102 defines a run-off surface 110 that is generally configured to direct substances such as liquids away from the membrane. In a variety of embodiments, including the one depicted, the run-off surface 110 is also configured to direct liquid towards the tank interior. In a variety of embodiments, the run-off surface can be referred to as a "gravity-enabled run-off surface 110," because gravity can help direct liquids along the run-off surface 110 and, in some embodiments, to the tank interior.

In the current embodiment the run-off surface 110 partially defines the first vapor passageway 224. The run-off surface 110 is central to the tank mounting surface 108. The run-off surface 110 is central to the first and second media mounting surfaces 112, 113. The run-off surface 110 is a radial flange that extends inwardly from the first media mounting surface 112 and is substantially concentric to the first media mounting surface 112. The term "substantially concentric" is intended to mean that the run-off surface 110 shares a central area, or even the center itself, with the first media mounting surface 112. For example, a run-off surface that is substantially concentric to the first media mounting surface 112 may permissibly have a shape that is only partially contained within the boundaries of the first media mounting surface 112, is not precisely circular in shape, or both, if its ability to direct fluid away from the filter element 104 is not materially altered. The run-off surface 110 is inclined towards the first vapor passageway 224 and therefore is configured to incline towards a tank interior. The run-off surface 110 is additionally inclined away from the filter element 104. The term "inclined" is intended to mean a surface that is configured to be between a horizontal and vertical position. It will be appreciated that the run-off surface need not be linear in all embodiments, and could be curved in some embodiments. In some embodiments a portion of the run-off surface can define one or more divots about a circumference to particularly direct fluid flow along particular pathways.

In some embodiments, tank vents in accordance with the technology disclosed herein can incorporate alternate run-off surface designs and/or multiple types of run-off surfaces. For example, a run-off surface could be incorporated in a tank vent that extends outwardly from, and is substantially concentric to, the outer perimeter of the first media mounting surface of the base portion. In such an embodiment the run-off surface would be inclined away from the media mounting surface and away from the vent housing. In such an embodiment the run-off surface would be configured to be inclined downwardly from the first media mounting surface to allow gravity to enable fluid flow away from the media mounting surface. In another example embodiment, a plurality of discrete run-off surfaces can be incorporated in the structure of the base portion that incline away from the gap 117 defined between the cap portion 114 and the base portion 106. In yet other embodiments, no run-off surface is incorporated in the design.

The run-off surface 110 can have a number of advantages in accordance with the technology disclosed herein. The run-off surface 110 can substantially prevent liquids, such as liquid urea, from entering the media of the filter element. The run-off surface 110 can also facilitate liquid removal from the filter element, which can be advantageous in situations where the tank contains a liquid that can crystalize. For example, when a tank vent 100 is subjected to atmospheric conditions such as freeze and thaw cycles, liquids that come into contact with the filter element 104 would cause damage to the filter element 104 upon freezing. As another example, crystal growth can result on surfaces that are repeatedly exposed to some types of liquids, such as aqueous urea, which could damage the filter element 104.

As mentioned above, the housing 102 also defines a first media mounting surface 112 and a second media mounting surface 113 that are surfaces for the filter element 104 to be mounted to. The base portion 106 defines the first media mounting surface 112 and the cap portion 114 defines a second media mounting surface 113. The filter element 104 is generally sealed to the first media mounting surface 112 and second media mounting surface 113 such that a substantial portion, if not all, airflow through the vent housing 102 is directed through the filter element 104. In the current embodiment, the first media mounting surface 112 and the second media mounting surface 113 define a ring shape that corresponds to the profile of the respective non-filtering surfaces of the filter element 104.

The base portion 106 and the cap portion 114 of the housing 102 defines the first vapor passageway 224 that is configured to extend from a tank interior to the filter element 104. In particular, the first vapor passageway 224 is defined by the inner surfaces of the stem 108 and the run-off surface 110 of the base portion 106 and the cap portion 114. While in the current embodiment, the first vapor passageway 224 extends through the vent housing 102 to the central opening 230 of the filter element 104, those having skill in the art will appreciate that, in some alternate example embodiments, the first vapor passageway and the second vapor passageway can be reversed. For example, in one alternate embodiment the first vapor passageway can be configured to extend from a tank interior to the outer circumference of the pleated filter element, and the second vapor passageway can extend from the central opening of the pleated filter element to the atmosphere.

Figure 7:
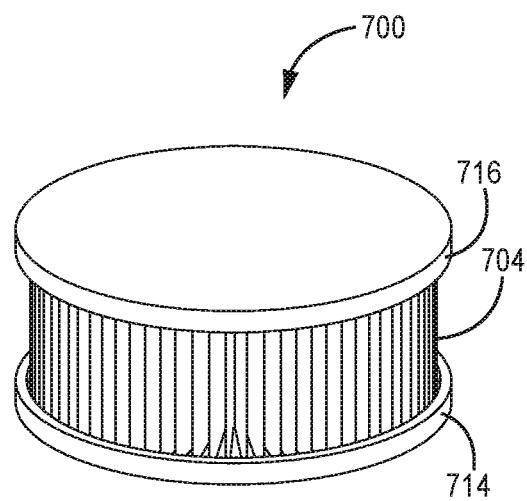
FIG. 7 is a perspective view of a tank vent sub-assembly, according to various embodiments.
Figure 8:
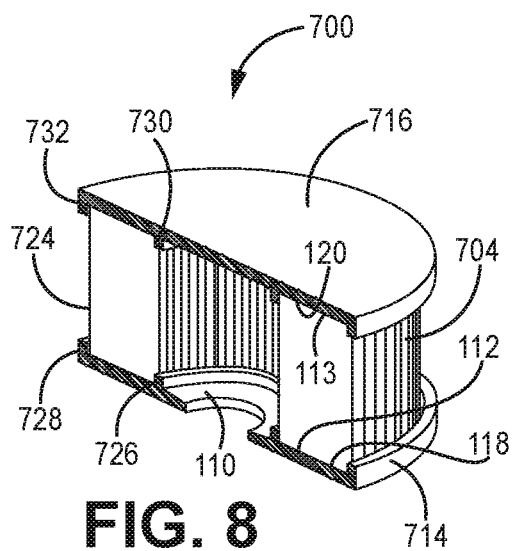
FIG. 8 is a cross-section of a perspective view of a tank vent sub-assembly consistent with that depicted in FIG. 7.
Figure 9:
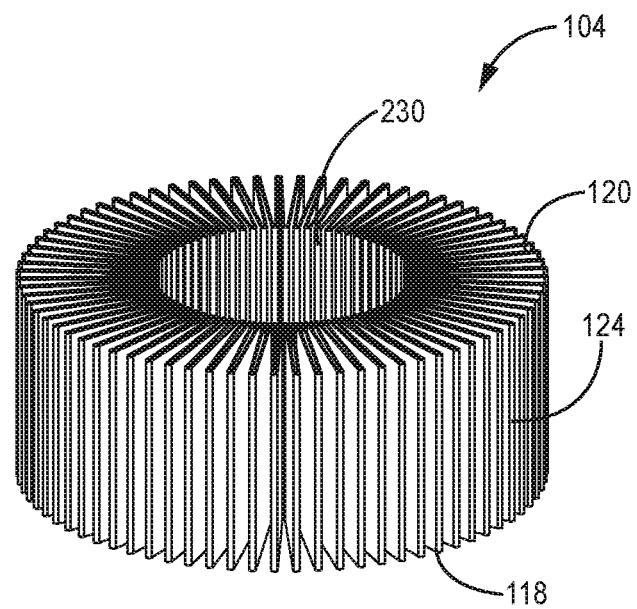
FIG. 9 is a perspective view of a filter element consistent with various embodiments.

FIG. 9 depicts a tubular filter element consistent with the implementations depicted in FIGS. 1-8, where the term "filter element" as used herein refers to a pleated filter material that is substantially shaped to its intended configuration for coupling to a housing and use in a tank vent. The filter element 104 has a tubular structure having an inner circumference 122, an outer circumference 124, a first end 118 and a second end 120. The inner circumference 122 defines an outer boundary of a central opening 230 of the tubular structure of the filter element 104 that mutually defines the first vapor passageway 224 of the tank vent 100 (See FIG. 1).

The filter element 104 is generally a pleated, vapor permeable membrane in a variety of embodiments consistent with the technology disclosed herein. In a variety of embodiments the membrane is a microporous membrane. In the embodiments consistent with FIGS. 1-9, the filter element 104 defines pleats extending from the inner circumference 122 to the outer circumference 124 such that pleat folds define the inner circumference 122 and the outer circumference 124. Pleating the microporous membrane increases the surface area of the filter element 104, which can increase airflow through the filter element 104. Maximizing airflow can be desirable in implementations where the volume of fluid in a tank fluctuates rapidly. For example, in urea tanks used in diesel engine exhaust systems, the level of urea in the tank can change rapidly during filling operations, necessitating the rapid release of vapor from the tank into the atmosphere.

Returning back to FIG. 1, the first end 118 of the filter element 104 is sealed to the first media mounting surface 112. The second end 120 of the filter element 104 is sealed to the second media mounting surface 113. The first end 118 and second end 120 of the filter element 104 can be sealed to their respective media mounting surfaces 112, 113 with a variety of types of adhesives, as will be appreciated by those having skill in the art. In one alternate embodiment, the tubular structure of the filter element can be tapered. For example, the structure of the filter element can have a particular outer diameter on one end that tapers to a relatively smaller outer diameter on the second end. In such an embodiment the inner diameter of the filter element can remain constant from the first end to the second end, or not. In an embodiment, the tubular structure of the filter element 104 can be substantially concentric to the run-off surface 110.

The membrane that is used to construct the filter element 104 is generally vapor-permeable to allow vapors to pass through the filter element 104. In a variety of embodiments the membrane is microporous and defines pore sizes ranging from 0.05 to 5.0 microns, 0.2 to 4.0 microns, or 0.5 to 3.0 microns. In one embodiment the microporous membrane has an average pore size of about 1.5 microns. In one embodiment the microporous membrane has a maximum pore size of 3.0 microns. In a variety of embodiments the microporous membrane can have a PTFE layer. In some embodiments, the microporous membrane can have a PTFE layer coupled to a scrim layer. In some embodiments, the microporous membrane can have three layers, such as a PTFE layer that is positioned between two scrim layers. In some other embodiments, the microporous membrane can have three layers, where a single scrim layer is laminated between two PTFE layers. The scrim layer is generally configured to increase the strength and/or stiffness of the membrane. In one embodiment the scrim layer is polyester. The scrim layer can also be other materials and combinations of materials such as, for example, PE, PET, and polypropylene.

Those having skill in the art will appreciate that the materials used to construct the microporous membrane will generally be compatible for the environment in which the tank vent will be used. For example, in the context of a urea tank vent, the microporous membrane, including the scrim layer, will be chemically compatible with aqueous urea. In various embodiments, the microporous membrane will have an oleophobic treatment, such that the microporous membrane repels oil. An oleophobic treatment can also encourage roll-off of liquids that come into contact with the microporous membrane such as aqueous urea. As such, an oleophobic treatment can increase vent life and reduce pore blockages in the microporous membrane that could result from liquid contact with the microporous membrane.

In an embodiment not depicted herein, the tank vent can have a splash guard, such as a filter or other device to impede the flow of liquid to the filter element. Such a configuration can be advantageous in implementations of the current technology that are used in vehicles, such as if the tank vent is in a vehicle rollover. Such configuration can also be advantageous by preventing ice crystals, which may form in extreme environmental temperatures, from splashing against the filter and rupturing the microporous membrane. In an embodiment, the splash guard can be coupled to the housing within the first vapor passageway. In an embodiment, the splash guard can define at least a portion of the first vapor passageway. In one particular embodiment the splash guard is a filter media extending across the first vapor passageway. The filter media can be a polyethylene filter media, for example, but the filter media can also be polypropylene or PET, as other examples. In a variety of embodiments the splash guard can be coupled to the housing with an adhesive or by any other means that will be appreciated by those having skill in the art. In another embodiment the splash guard is a metal or plastic web or screen extending across the first vapor passageway. In at least one embodiment, the splash guard will be chemically compatible with aqueous urea.

Figure 4:
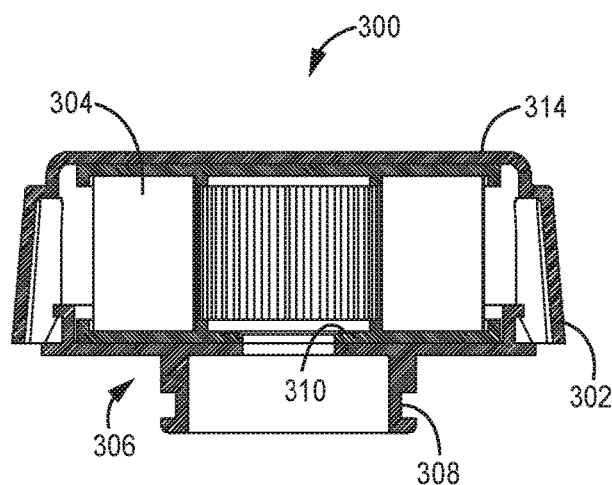
FIG. 4 is a cross-section view of a tank vent consistent with FIG. 3.

FIG. 3 shows a perspective view of a cross-section of a tank vent 300, according to an embodiment. FIG. 4 shows a cross-section view of a tank vent 300 consistent with the embodiment depicted in FIG. 3. As discussed above, the tank vent 300 is generally configured to be coupled to a tank, such as a urea tank used in the exhaust system of a diesel engine. The tank vent has a base portion 306 defining a first media mounting surface 312 and a cap portion 314 defining a second media mounting surface 313. A pleated microporous membrane filter element 304 is sealed to the first media mounting surface 312 and the second media mounting surface 313. A gravity-enabled run-off surface 310 is defined central to the first media mounting surface 312 and is inclined away from the first media mounting surface 312 and is configured to be inclined towards a tank interior.

In the current embodiment, the vent housing 302 defines a male portion of a press-fit coupling 308 that is configured to be received by an opening defined by the tank. An O-ring can be deposited about the press-fit coupling 308 to ensure a sealed connection between the vent housing 302 and the tank. In an alternate embodiment, the tank vent 300 can be configured to receive a male portion of a press-fit coupling that is defined by a tank.

Figure 5:
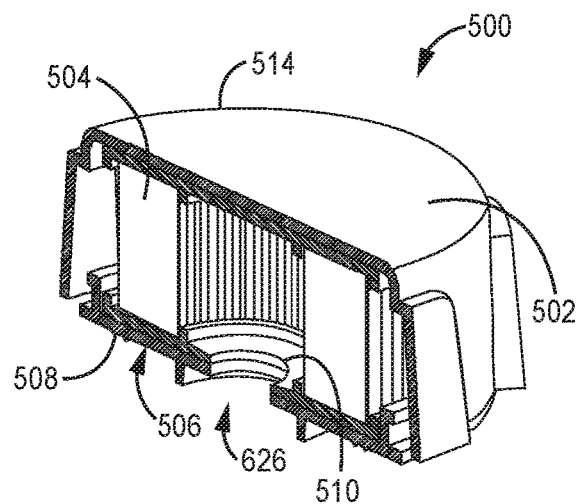
FIG. 5 is a perspective view of a cross-section of an alternative tank vent, according to an embodiment.
Figure 6:
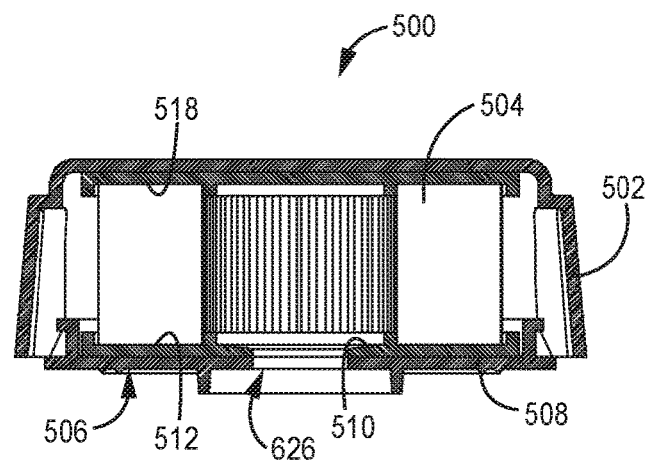
FIG. 6 is a cross-section view of a tank vent consistent with the embodiment depicted in FIG. 5.

FIG. 5 shows a perspective view of a cross-section of a tank vent 500, according to an embodiment. FIG. 6 shows a cross-section view of a tank vent 500 consistent with the embodiment depicted in FIG. 5. The vent housing 502 has a base portion 506 and a cap portion 514. The base portion 506 defines a tank mounting surface 508 that is configured to mount to a tank and a first media mounting surface 512 that is sealed to a first end 518 of a pleated, tubular microporous membrane filter element 504. The cap portion 514 defines a second media mounting surface 513 that is sealed to a second end 520 of the filter element 504. A gravity-enabled run-off surface 510 is defined central to the first media mounting surface 512 and is inclined away from the first media mounting surface 512 and is configured to be inclined towards a tank interior.

In the current embodiment, the tank mounting surface 508 is configured to be welded to a tank, although other means of adhering the vent housing to the tank are also contemplated, such as through adhesives and the like. In an embodiment, the tank mounting surface 508 can be defined by a polymer with a relatively low melting point compared to the material used for the tank housing itself to easily weld the housing to a tank. The tank mounting surface 508 is generally configured to bring an opening defined by the vent housing, particularly the first vapor passageway 626, in communication with a tank interior. The tank mounting surface 508 is also generally configured to create a seal with the tank about the first vapor passageway 626.

FIG. 7 shows a perspective view of a tank vent sub-assembly 700 having a filter element 704 according to various embodiments, including those depicted in FIGS. 1-6. FIG. 8 shows a cross-section of a perspective view of a tank vent sub-assembly 700 that is consistent with the embodiment depicted in FIG. 7. The sub-assembly 700 has a first end cap 714, a second end cap 716, and the pleated, tubular microporous membrane filter element 704 sealed to the first end cap 714 and the second end cap 716. The first end cap 714 and the second end cap 716 can be disposed on opposite ends of the filter element 704.

Referring back to FIG. 1 as an example, the first end cap 714 and the second end cap 716 can be characterized as components of the vent housing 102. Further, the first end cap 714 can be characterized as a component of the base portion 106 and the second end cap 716 can be characterized as a component of the cap portion 114. In at least one embodiment, the tank vent sub-assembly 700 is separable from the housing of the tank vent 102. In at least one embodiment, the tank vent sub-assembly 700 is a replaceable component of the tank vent 100. In other embodiments, however, the tank vent sub-assembly is rigidly sealed to the tank vent housing 102. In such embodiments, the first end cap 714 can be sealed to the base portion 106 and the second end cap 716 can be sealed to the cap portion 114 with welding, adhesives, gaskets, and the like.

Those having skill in the art will appreciate tank vent designs that do not incorporate a first end cap and a second end cap, and/or tank vent designs that have a first end cap and a second end cap that are integral to the base portion and the cap portion, respectively. Referring again to FIGS. 7 and 8, the first media mounting surface 112 and the second media mounting surface 113 are now described in more detail. In particular, the first end-cap 714 defines the first media mounting surface 112 that is configured to receive the first end 118 of the filter element 104. A first inner circumferential flange 726 is configured to abut the inner circumference of the first end 118 of the filter element 104 and a first outer circumferential flange 728 is configured to abut the outer circumference of the first end 118 of the filter element 104.

Similarly, the second end-cap 716 defines the second media mounting surface 113 that is configured to receive the second end 120 of the filter element 104. A second inner circumferential flange 730 is configured to abut the inner circumference of the second end 120 of the filter element 104 and a second outer circumferential flange 732 is configured to abut the outer circumference of the second end 120 of the filter element 104. The circumferential flanges 726, 728, 730, 732 can have a variety of advantages including improving the seal between the housing and the filter element 104, preventing liquid contact with the microporous membrane, preventing translation of the filter element 104 relative to the housing, and the like.

Figure 10:
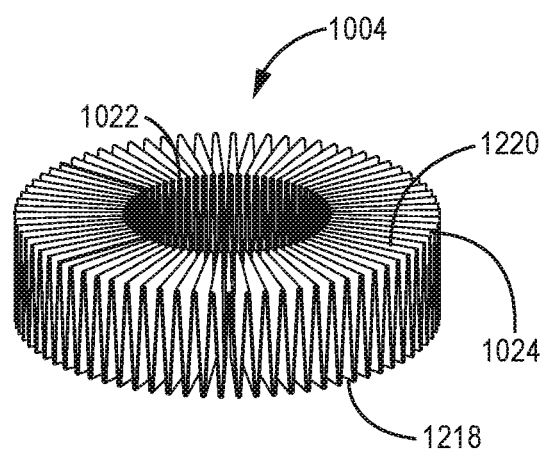
FIG. 10 is a perspective view of an alternative filter element, according to an embodiment.

FIG. 10 shows a perspective view of an alternate filter element 1004 configuration, according to an embodiment. The filter element 1004 is generally a pleated microporous membrane that is in a tubular configuration with an inner circumference 1022 and an outer circumference 1024 and has a depth extending from a first end 1218 to a second end 1220 of the tubular structure. The filter element 1004 defines a plurality of pleats extending along the depth of the tubular structure where the pleat folds define the first end 1218 and the second end 1220 of the filter element 1004. The filter element 1004 can be constructed of materials and combinations of materials that have already been described herein.

Figure 11:
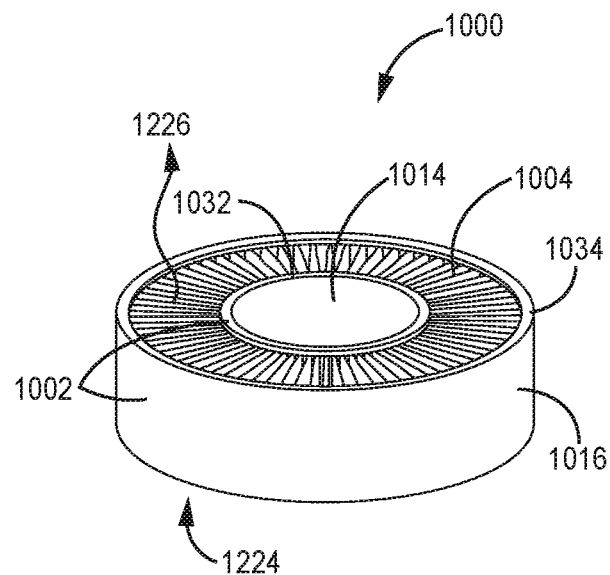
FIG. 11 is a perspective view of an alternative tank vent sub-assembly, consistent with the pleated membrane depicted in FIG. 10.
Figure 12:
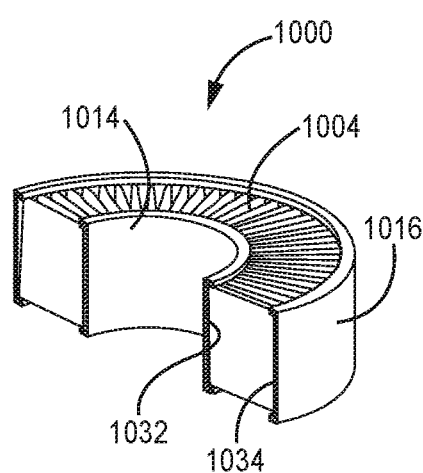
FIG. 12 is a cross-section view of the perspective view of the alternative tank vent sub-assembly depicted in FIG. 11.

FIG. 11 shows a perspective view of the filter element 1004 incorporated in an alternate tank vent sub-assembly 1000 design, according to an embodiment. FIG. 12 shows a cross-section of a perspective view of the sub-assembly 1000, consistent with the embodiment depicted in FIG. 11. Similar to embodiments already described herein, the sub-assembly 1000 can be configured to couple to a liquid tank, such as a urea tank used in a diesel vehicle exhaust system. In a variety of embodiments, the sub-assembly 1000 is received by a tank vent housing that is configured to couple to a liquid tank. The sub-assembly 1000 has a frame 1002 and a filter element 1004 disposed within the frame 1002. The frame 1002 of the sub-assembly 1000 is generally configured to direct airflow between the interior of a tank (to which it is coupled) and the atmosphere through the filter element 1004.

The frame 1002 defines a first media mounting surface 1014 sealed to the inner circumference of the filter element 1004 and a second media mounting surface 1016 sealed to the outer circumference of the filter element 1004. As such, the frame 1002 defines a first vapor passageway 1224 configured for direct communication with the interior of a tank and a second vapor passageway 1226 configured for direct communication with the atmosphere such that air passing between the interior of the tank and the atmosphere is directed through the filter element 1004. The frame 1002 can incorporate a variety of tank mounting surfaces that are mountable to a tank housing, as has been described previously.

Figure 13:
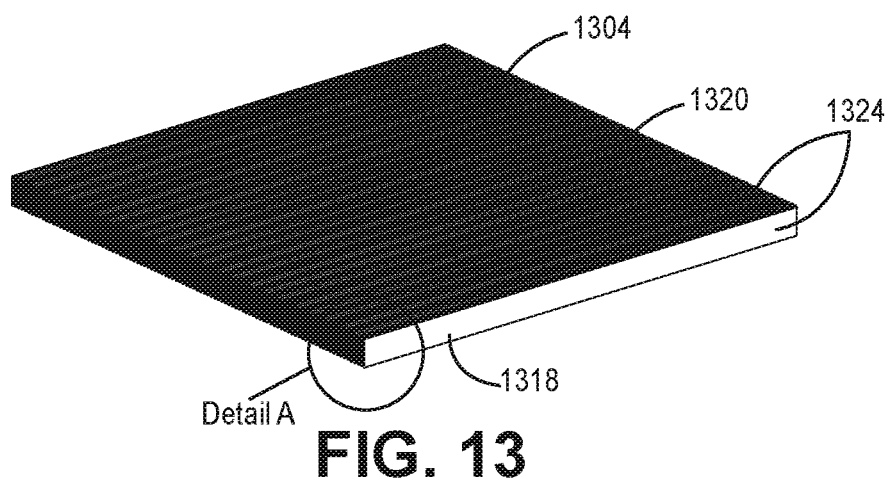
FIG. 13 is a perspective view of a filter element, according to an embodiment.
Figure 14:
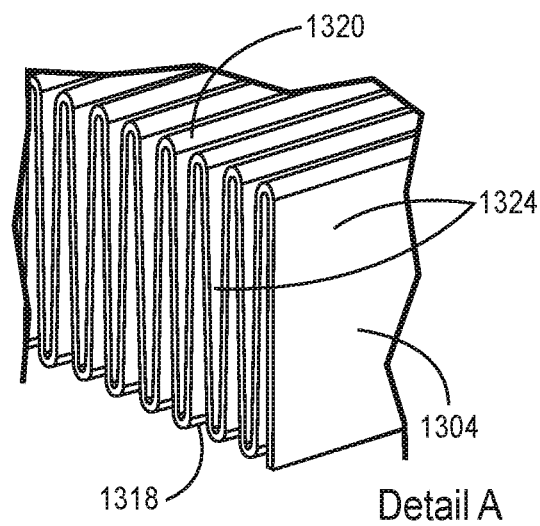
FIG. 14 is a detail view of a portion of the filter element depicted in FIG. 13.

FIG. 13 depicts a perspective view of the filter element 1304 and FIG. 14 depicts Detail A of FIG. 13. In the current embodiment, the filter element 1304 is in a panel configuration having an outer perimeter 1324 and has a depth extending from a first end 1318 to a second end 1320. The filter element 1304 defines a plurality of pleats extending along that depth such that pleat folds define the first end 1318 and the second end 1320. The filter element 1304 can be constructed of materials and combinations of materials that have already been described herein.

Figure 15:
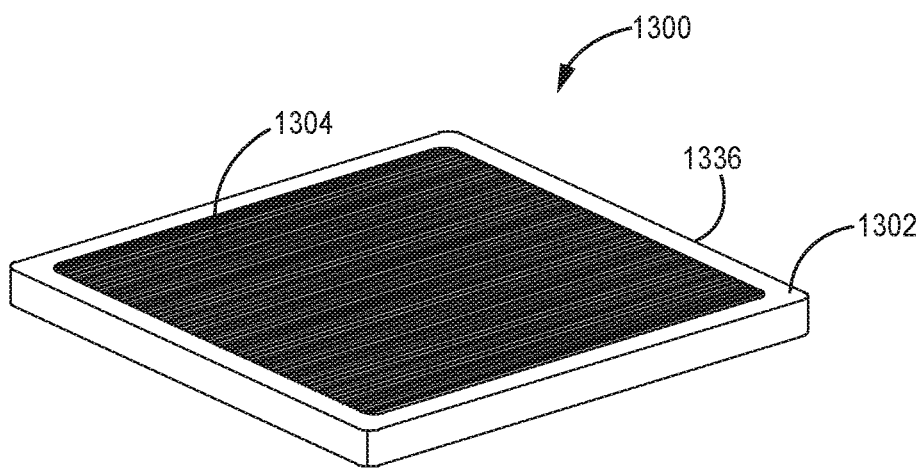
FIG. 15 is a perspective view of a tank vent sub-assembly, according to an embodiment.
Figure 16:
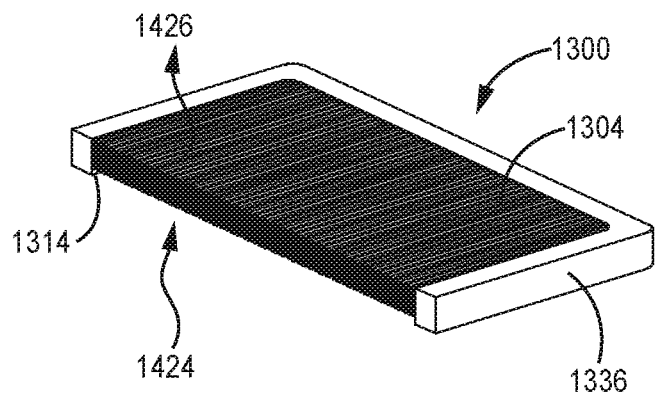
FIG. 16 is a cross-section view of a perspective view of a tank vent sub-assembly consistent with the embodiment depicted in FIG. 15.

FIG. 15 depicts a perspective view of a tank vent sub-assembly 1300, according to an embodiment. FIG. 16 shows a cross-section of a perspective view of the tank vent sub-assembly 1300, consistent with the embodiment depicted in FIG. 15. In the current embodiment, the tank vent sub-assembly 1300 is consistent with a rectangular panel filter, although those having skill in the art will appreciate that a panel filter can be used that has another shape.

Similar to embodiments already described herein, the tank vent sub-assembly 1300 can be configured to couple to a liquid tank, such as a urea tank used in a diesel vehicle exhaust system. The tank vent sub-assembly 1300 has a frame 1302 and a filter element 1304 disposed within the frame 1302. The frame 1302 of the sub-assembly 1300 is generally configured to direct airflow between the interior of a tank (to which it is coupled) and the atmosphere through the filter element 1304. In at least one embodiment, the sub-assembly 1300 depicted is a sub-assembly that can be used in combination with additional tank vent housing components.

The frame 1302 defines a first media mounting surface 1314 sealed to the outer perimeter of the filter element 1304. As such, the frame 1302 defines a first vapor passageway 1424 configured for direct communication with the interior of a tank and a second vapor passageway 1426 configured for direct communication with the atmosphere such that air passing between the interior of the tank and the atmosphere is directed through the filter element 1304. The frame can incorporate a variety of tank mounting surfaces that are mountable to a tank housing, as has been described previously, or can be used in conjunction with additional vent housing components that are mountable to a tank housing.

Figure 17:
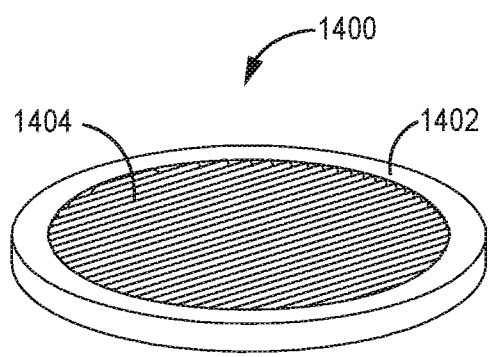
FIG. 17 is a perspective view of an alternate tank vent sub-assembly according to an embodiment.
Figure 18:
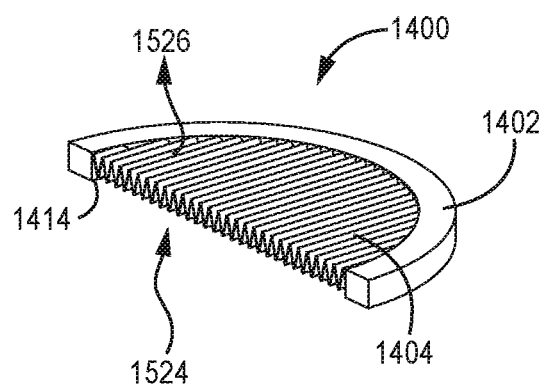
FIG. 18 is a cross-section of the perspective view of the alternate tank vent sub-assembly depicted in FIG. 17.

FIG. 17 depicts a perspective view of a tank vent sub-assembly 1400, according to an embodiment. FIG. 18 shows a cross-section of a perspective view of the tank vent sub-assembly 1400, consistent with the embodiment depicted in FIG. 17. In the current embodiment, the tank vent sub-assembly 1400 is consistent with a circular panel filter, although those having skill in the art will appreciate that a panel filter can be used that has another shape.

Similar to embodiments already described herein, the tank vent sub-assembly 1400 can be configured to couple to a liquid tank, such as a urea tank used in a diesel vehicle exhaust system. The tank vent has a frame 1402 and a filter element 1404 disposed within the frame 1402. The frame 1402 of the tank vent sub-assembly 1400 is generally configured to direct airflow between the interior of a tank (to which it is coupled) and the atmosphere through the filter element 1404. In at least one embodiment, the tank vent sub-assembly 1400 depicted is a sub-assembly that can be used in combination with additional tank vent housing components, as will be appreciated.

The frame 1402 defines a first media mounting surface 1414 sealed to the outer perimeter of the filter element 1404. As such, the frame 1402 defines a first vapor passageway 1524 configured for direct communication with the interior of a tank and a second vapor passageway 1526 configured for direct communication with the atmosphere such that air passing between the interior of the tank and the atmosphere is directed through the microporous membrane of the filter element 1404. The frame can incorporate a variety of tank mounting surfaces that are mountable to a tank housing, as has been described previously, or can be used in conjunction with additional vent housing components that are mountable to a tank housing.

The sub-assemblies depicted in FIGS. 11-12 and 15-18 do not depict a run-off surface, however, the sub-assemblies could be incorporated in additional tank vent housing components that define run-off surfaces. In such embodiments, where the filter element defines pleat folds defining the first end and the second end of the filter element, a run-off surface could be incorporated by the tank vent housing. In an embodiment, a run-off surface can extend from the housing and incline away from the microporous membrane. Such a run-off surface can also be configured to incline towards a tank interior. The run-off surface can be substantially concentric to the structure of the filter element. Similarly, the sub-assemblies depicted in FIGS. 11-14 and 17-18 can also be incorporated in vent housings having a splash guard, as has been described with reference to FIG. 1, which can be configured to impede the flow of liquid to the filter element and/or reduce the force exerted on the microporous membrane by ice crystals that may have formed in the tank and could otherwise splash against the microporous membrane.

Figure 19:
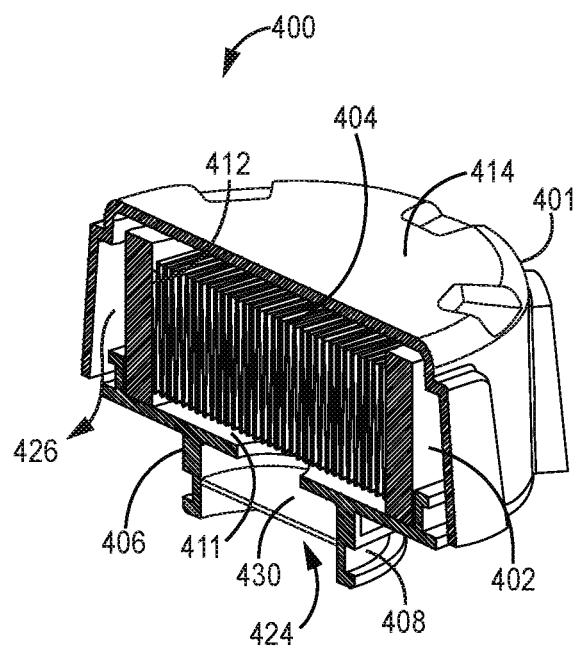
FIG. 19 is a perspective view of a cross-section of an alternative tank vent, according to an embodiment.
Figure 20:
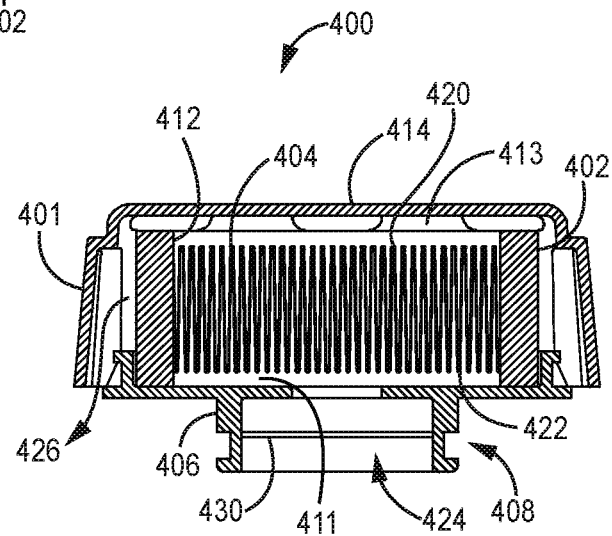
FIG. 20 is a cross-section view of a tank vent consistent with FIG. 19.

FIG. 19 is a perspective view of a cross-section of an alternative tank vent 400, according to an embodiment, particularly a tank vent that incorporates a tank vent sub-assembly similar to that depicted in FIGS. 17-18. FIG. 20 is a cross-section view of a tank vent 400 consistent with FIG. 19. In one embodiment the tank vent is configured to be coupled to a urea tank, although other liquid tanks are also contemplated.

The tank vent 400 has a housing 401 and a filter element 404 that is a pleated microporous membrane. The housing 401 defines a first vapor passageway 424 configured for direct communication with a tank interior 424 and a second vapor passageway 426 configured for direct communication with the atmosphere 426, where the first vapor passageway 424 and the second vapor passageway 426 are in communication through the filter element 404. The filter element 404 is sealed to a media mounting surface 412 defined by the housing 401. The filter element 404 has a structure defining a depth between a first end 422 and second end 420 of the filter element 404, where the pleats of the filter element 404 extend along the depth such that pleat folds define the first end 422 and second end 420. The housing 401 also defines a tank mounting surface 408 that is mountable to a tank housing.

The vent housing 401 has a base portion 406 and a cap portion 414. The base portion 406 defines the tank mounting surface 408 that is configured to mount to a tank and the media mounting surface 412 that is sealed to the perimeter of the pleated microporous membrane filter element 404. In the current embodiment, the tank mounting surface 412 is defined by a frame 402 that extends around the perimeter of the filter element 404. The frame 402 is sealed to the base portion 406 so that the first vapor passageway 424 is sealed off from the environment outside of the tank vent 400.

A first clearance 411 is defined between the base portion 406 and the filter element 404 to allow airflow through a substantial portion of the face of the filter element 404 adjacent the first vapor passageway 424. Similarly, a second clearance 413 is defined between the cap portion 414 and the filter element 404 to allow airflow through a substantial portion of the face of the filter element 404 adjacent the second vapor passageway 426. While not depicted, a gravity-enabled run-off surface can be defined central to the media mounting surface 412 and that is inclined away from the media mounting surface 412 and is configured to be inclined towards a tank interior.

In the current embodiment, the vent housing 401 defines a tank mounting surface 408 that is a male portion of a press-fit coupling, which is configured to be received by an opening defined by the tank. An O-ring can be deposited about the press-fit coupling 408 to ensure a sealed connection between the vent housing 401 and the tank. In an alternate embodiment, the tank vent 400 can be configured to receive a male portion of a press-fit coupling that is defined by a tank.

The embodiments depicted in FIGS. 19 and 20 incorporate a splash guard 430, which can be consistent with splash guards already described herein. The splash guard 430 is coupled to the housing within the first vapor passageway and defines a portion of the first vapor passageway. As described above, the splash guard 430 can be filter media extending across the first vapor passageway. The splash guard 430 can help prevent liquids and solids in a tank from making contact with the filter element 404.

Figure 21:
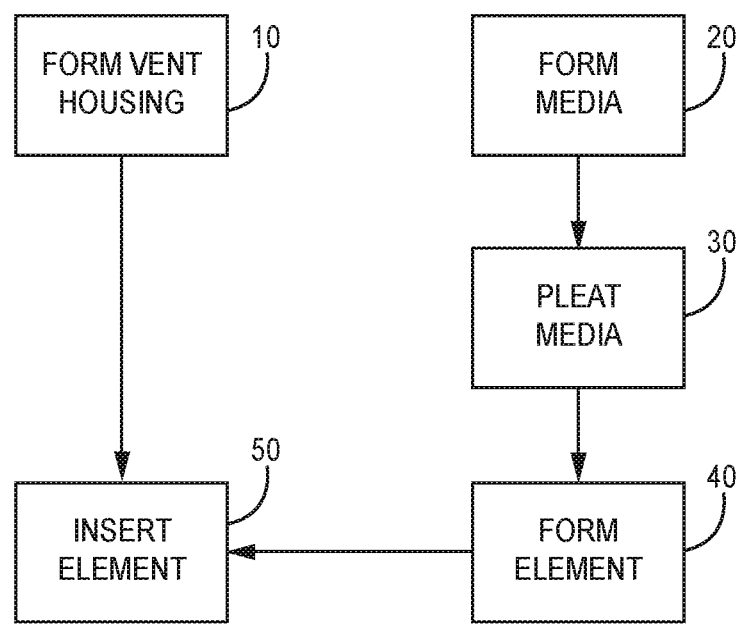
FIG. 21 depicts a flow chart consistent with one example method consistent with the technology disclosed herein.

FIG. 21 shows a flow chart depicting a method of making a tank vent, according to an embodiment. The vent housing is formed 10, the media is formed 20 and pleated 30 and then formed into a filter element 40, and the filter element is inserted into the vent housing 50.

Forming the vent housing 10 can be accomplished in a variety of ways, as will be appreciated. In some embodiments, forming the vent housing 10 is accomplished through molding of the components, although other approaches and combinations of approaches can be used. In one particular embodiment, forming the vent housing 10 is done through injection molding. As such, the housing components can be constructed of a plastic that is amenable to the injection molding.

Generally, forming the vent housing 10 will encompass forming a media mounting surface, where the media mounting surface is configured to seal to pleated media. As such, forming the vent housing 10 can encompass forming the first end cap and the second end cap in embodiments consistent with FIGS. 7-8. Also consistent with the embodiments depicted in FIGS. 1-9, forming the vent housing 10 can also encompass defining an opening that is configured to be in communication with a tank interior. In such an embodiment the opening can be defined by the media mounting surface and, in some embodiments, a tank mounting surface. Forming the vent housing 10 also can encompass forming a gravity-enabled run-off surface of the housing that is inclined away from the media mounting surface and inclined towards the opening. In at least one embodiment, the gravity-enabled run-off surface can be machined, although in other embodiments the gravity-enabled run-off surface is injection molded with the rest of the housing.

The media can be formed 20 in a variety of ways, but in some embodiments the media is formed by heat and pressure laminating one or more layers of a PTFE membrane with one or more layers of a scrim. In some embodiments adhesive is used to laminate two layers together. Example media layers and combinations of layers has been described above. Pleating the filter media 30 can be accomplished through means generally known in the art, such as through the use of a pleater, for example. In a variety of embodiments, the particular scrim layer[s] used can be chosen based on its ability to retain its structural integrity during the pleating process.

The filter element is then formed 40. Consistently with embodiments depicted in FIGS. 1-9, the pleated media can be formed into a filter element having tubular structure, with the pleats extending from an inner circumference to an outer circumference of the tubular structure. Alternatively, and consistently with the embodiment depicted in FIGS. 10-12, the pleated media can be formed into a tubular filtration element having a first end and second end defining a depth, where the pleats extend along the depth of the tubular filtration element such that pleat folds define the first end and the second end of the filter element. Alternatively, and consistently with the embodiment depicted in FIGS. 13-18, a sheet of pleated filter media can be cut to a desirable element shape.

The filter element can then be inserted into the vent housing 50. In a variety of embodiments, the filter element is sealed to the mounting surface of the vent housing 50 which can be end caps, consistently with the embodiments depicted in FIGS. 1-8, or perimeter frame(s) consistently with the embodiments depicted in FIGS. 11-12 and 15-18, to form a sub-assembly. A seal can be formed through the use of one or more adhesives, for example. Consistent with the embodiments depicted in FIGS. 1-9, inserting the filter element in the vent housing 50 encompasses sealing at least the first end of the filtration element to a mounting surface of the housing to form a filter vent sub-assembly. Consistent with the embodiments depicted in FIGS. 10-18, inserting the filter element in the vent housing 50 can encompass sealing a perimeter of the filter element to the vent housing to form a filter vent sub-assembly.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference.

The current technology has been described with reference to various specific and preferred embodiments and techniques. However, it should be understood that many variations and modifications may be made while remaining within the spirit and scope of the technology.

The invention claimed is:

1. A urea tank vent comprising:
   a housing defining
   a first vapor passageway configured for direct communication with a tank interior,
   a second vapor passageway configured for direct communication with the atmosphere,
   a tank mounting surface mountable to a tank housing,
   a media mounting surface;
   a vapor-permeable pleated microporous membrane sealed to the media mounting surface, the microporous membrane defining structure having a depth defined between a first end and a second end, wherein the pleats extend along the depth such that pleat folds define the first end and the second end and wherein the first vapor passageway and the second vapor passageway are in communication through the microporous membrane, wherein the microporous membrane defines a tubular structure defining the depth; and
   a first endcap defining the media mounting surface, wherein the first endcap comprises an inner circumferential flange abutting an inner circumference of the microporous membrane.

2. The tank vent of claim 1, wherein the tank mounting surface is weldable to the tank.

3. The tank vent of claim 1, wherein the tank mounting surface defines a threaded stem that is configured to be received by an opening defined in the tank housing.

4. The tank vent of claim 1, wherein the tank mounting surface defines a press-fit coupling that is configured to receive an opening defined in the tank housing.

5. The tank vent of claim 1, wherein the microporous membrane comprises PTFE having an oleophobic treatment.

6. The tank vent of claim 1, the housing further comprising a gravity-enabled run-off surface partially defining the first vapor passageway, wherein the run-off surface is configured to incline towards the tank interior and away from the microporous membrane.

7. The tank vent of claim 6, wherein run-off surface is substantially concentric to the microporous membrane.

8. The tank vent of claim 1, further comprising a media splash guard coupled to the housing, wherein the splash guard at least partially defines the first vapor passageway.

9. The tank vent of claim 1, wherein the microporous membrane comprises PTFE coupled to a scrim layer.

10. The tank vent of claim 1, wherein the tank housing is a urea tank.

* * * * *